United States Patent
Doyle et al.

[11] Patent Number: 5,974,356
[45] Date of Patent: Oct. 26, 1999

[54] SYSTEM AND METHOD FOR DETERMINING VEHICLE TRAVEL ROUTES AND MILEAGE

[75] Inventors: Thomas F. Doyle, San Diego; Mark Bauckman, El Cajon; Dennis Harlow, San Diego, all of Calif.

[73] Assignee: Qualcomm Incorporated, San Diego, Calif.

[21] Appl. No.: 08/951,033

[22] Filed: Oct. 15, 1997

Related U.S. Application Data

[60] Provisional application No. 60/036,239, Mar. 14, 1997.

[51] Int. Cl.$^6$ .............................. G01S 5/14; G01C 21/20
[52] U.S. Cl. ..................... 701/209; 701/205; 701/214; 342/357
[58] Field of Search ...................... 701/201, 202, 701/205, 208, 209, 210, 211, 213, 214, 215, 35; 340/990, 995; 342/357

[56] References Cited

U.S. PATENT DOCUMENTS

| | | | |
|---|---|---|---|
| 5,017,926 | 5/1991 | Ames et al. | 342/353 |
| 5,068,656 | 11/1991 | Sutherland | 340/989 |
| 5,359,528 | 10/1994 | Haendel et al. | 364/424.04 |
| 5,422,815 | 6/1995 | Hijikata | 364/449 |
| 5,541,845 | 7/1996 | Klein | 701/207 |
| 5,648,768 | 7/1997 | Bouve | 340/988 |
| 5,682,133 | 10/1997 | Johnson et al. | 340/426 |
| 5,694,322 | 12/1997 | Westerlage et al. | 705/417 |
| 5,699,255 | 12/1997 | Ellis et al. | 701/212 |
| 5,751,245 | 5/1998 | Janky et al. | 342/357 |
| 5,767,804 | 6/1998 | Murphy | 342/357 |
| 5,787,383 | 7/1998 | Moroto et al. | 701/210 |

FOREIGN PATENT DOCUMENTS

| | | | |
|---|---|---|---|
| 0825418 | 2/1998 | European Pat. Off. | G01C 21/20 |
| 4402614 | 8/1995 | Germany | G07B 15/02 |
| 9514909 | 6/1995 | WIPO | G07B 15/00 |
| 963018 | 11/1996 | WIPO | G07B 15/00 |

OTHER PUBLICATIONS

"Navigation Apparatus" by Sumizawa Tsuguo; Patent Abstracts of Japan, vol. 096, No. 1, Jan. 31, 1996.

*Primary Examiner*—Tan Nguyen
*Attorney, Agent, or Firm*—Russell B. Miller; Thomas M. Thibault

[57] ABSTRACT

A system and method for determining a route of travel and associated mileage of a vehicle is disclosed. The system records a vehicle's identification number, location, and odometer mileage transmitted via satellite to a fixed station. The location data is provided to a processor which determines an estimated route of travel by said vehicle using a routing program. The estimated route is comprised of a plurality of position segments, each position segment having a corresponding mileage and average expected speed. The route of travel may be checked for accuracy by comparing the estimated route mileage to the odometer mileage. If a significant difference is found, a diagnostic procedure is performed which attempts to correct the mismatch by evaluating alternate routes of travel. If the alternative route mileage agrees with the actual odometer miles within a predetermined threshold, the new route and associated mileage is used as the "true" route taken by the vehicle. The diagnostic procedure can also identify position segments where the vehicle appeared to be traveling much slower or faster than the average speed for that position segment. The mileage difference can then be allocated proportionally to each identified suspect position segment to provide an accurate estimate of the miles driven within the predetermined jurisdiction. Once the route of travel has been verified, the mileage traveled by the vehicle can be accurately determined and used for various computations. For example, state fuel-taxes may be accurately calculated from the mileage information.

16 Claims, 7 Drawing Sheets

SYSTEM AND METHOD FOR DETERMINING VEHICLE TRAVEL ROUTES AND MILEAGE

This application claims benefit of Provisional application Ser. No. 60/036,239, filed Mar. 14, 1997.

BACKGROUND OF THE INVENTION

I. Field of the Invention

The present invention relates generally to vehicle monitoring systems and more particularly to electronic systems for estimating travel routes taken by a vehicle and the mileage associated therewith, without the need for manual intervention by a vehicle operator.

II. Description of the Related Art

A need is recognized by many in the mobile vehicle environment for tracking vehicle movement or activity in jurisdictions, and particularly for determining miles traveled by a vehicle within a particular jurisdiction. In the commercial trucking industry in particular such information is needed in order to determine the amount of fuel and highway tax liability owed to a state or other pre-defined jurisdiction. The amount of fuel and highway tax owed to each jurisdiction is dependent upon the number of highway miles traveled within that jurisdiction and the amount of fuel purchased within that jurisdiction.

Fuel tax reporting methods in the trucking industry today remain highly inefficient and extremely costly. Most companies devote large amounts of resources to determine their highway usage, to calculate fuel taxes, and to comply with state reporting requirements. Assessment of additional taxes, interest charges, and penalties can make non-compliance extremely costly. The burden is on individual trucking companies to comply with the regulations and to keep detailed records to substantiate what they report.

Heretofore, mileage information has been provided to the trucking company home base by the truck drivers themselves. Most carriers have relied on trip sheets, driver logs, and fuel purchase receipts/bulk storage records for fuel tax reporting. These inputs are subsequently reviewed, and then entered by clerical personnel as the basis for state fuel tax reports. Determining the tax due to each jurisdiction normally involves calculating the average miles per gallon for the entire fleet, calculating the total miles traveled in each state for the vehicle(s) under consideration, and the amount of fuel purchased in each state that the vehicle(s) has traveled. From this, an estimation of the fuel consumed in each state traveled can be determined, which is then compared to actual fuel purchases to determine the tax owed or credited.

Another method of determining miles traveled within a given jurisdiction involves submitting the vehicle's origin, destination, stop-offs and various additional points (i.e. fuel stops, cash advance locations) to a mileage routing package to obtain the "most practical route" traveled and then reporting that as the actual route driven. Carriers using this method are often assessed additional taxes because other documents allow the auditor to dispute the actual route traveled.

Another method of determining state mileage requires read-write transponders at pre-determined locations along the vehicle's travel routes. For example, transponders may be located at each state border, which sense or signal the crossing of state borders by the vehicle and thereupon permit mileage determination by reference to the vehicle's odometer reading at the time of crossing. Cost and privacy issues are primary obstacles for widespread acceptance of this method.

Another known method of jurisdictional mileage determination relies on satellite communications to transmit vehicle position, time that the position was determined, and odometer mileage to a fixed station where it is processed to determine the miles driven in each jurisdiction. An example of such a method is described in International Publication No. WO 96/36018 entitled "METHOD AND APPARATUS FOR DETERMINING TAX OF A VEHICLE" published on Nov. 14, 1996 and assigned to Highwaymaster Communications of Dallas, Tex. The same disclosure was filed in U.S. patent application Ser. No. 08/437,404, filed May 9, 1995. To date, neither patent has issued. The principle drawback of this method is that it requires odometer readings to be transmitted along with each vehicle position. This can be very expensive when using satellite communications because costs are incurred in proportion to the length of the data message. Transmitting odometer readings with each vehicle position transmission results in substantially greater costs to trucking companies, especially companies having very large fleets of vehicles.

Another known method of state mileage determination involves determining and recording the mileage a vehicle travels within a particular state using a GPS receiver, an odometer, a memory device which contains latitude/longitudinal state boundary information, and a processor for determining on a continual basis whether the positional information received from the GPS receiver corresponds to being within a particular state boundary, and recording mileage of the truck when the position and state boundary comparison determines that a change in state boundaries has occurred. An example of such a system is disclosed in U.S. Pat. No. 5,359,528 entitled "SYSTEM FOR ACCURATELY DETERMINING THE MILEAGE TRAVELED BY A VEHICLE WITHIN A STATE WITHOUT HUMAN INTERVENTION" issued Oct. 25, 1994 and assigned to Rockwell International Corporation. The data output, which includes the desired mileage within a particular state, is stored on the vehicle in a storage device. This method requires additional effort and expense to remove the information from the on-board vehicle storage device and load it into a carrier's computer system. A further drawback of this method is that information is not immediately available for a multiplicity of vehicles, such as an entire fleet, nor is information readily available at a single central location, where it would be most helpful, as needed by persons such as a fleet manager. Yet a further drawback of this method is that it requires continuous location monitoring by the GPS receiver and processing unit in order to determine as closely as possible the exact time and odometer mileage when the vehicle crosses a state boundary.

SUMMARY OF THE INVENTION

The present invention is a novel and improved system and method for estimating vehicle travel routes and miles associated therewith without manual intervention by a vehicle operator. From the route information, fuel taxes may be calculated, or a database may be generated which tracks the miles driven by a fleet of vehicles.

It is a feature of the present invention to include a satellite-based system for determining vehicle locations and providing the location data and a time-stamp to a fixed station for processing. In addition, actual odometer readings provided by the vehicle's odometer or hubometer are transmitted to the fixed station for use as an aid to refine the estimated miles driven in a given jurisdiction. The frequency at which odometer readings are transmitted is generally dependent on transmission cost considerations. Therefore, it is a feature of the present invention to accurately calculate jurisdictional mileage regardless of the frequency of the odometer transmissions.

The present invention provides location information at predetermined intervals of time, such as in one hour intervals, to a fixed station. Vehicle location may be accomplished using any one of a variety of vehicle position determining methods, such as LORAN-C or Global Positioning Satellite (GPS) methods. In the preferred embodiment, position data is calculated by the fixed station using a dual satellite navigation system as disclosed in U.S. Pat. No. 5,017,926, entitled "DUAL SATELLITE NAVIGATION SYSTEM AND METHOD" issued May 21, 1991 and assigned to the assignee of the present invention, the disclosure of which is incorporated by reference herein. A time-stamp, or the date and time that the location information was taken, is also recorded by the fixed station. Odometer/hubometer readings are not transmitted during hourly position reports. Rather, odometer/hubometer readings are transmitted upon the occurrence of other events, such as when a vehicle operator initiates a text message from the vehicle to the fixed station.

The fixed station records the vehicle's location, time-stamp, and odometer/hubometer readings as they are transmitted by the vehicle. A plurality of vehicles in a fleet may be monitored simultaneously. The fixed station contains a processor and a memory device which stores each vehicle's transmitted information. The position information is first checked for validity, then provided in sequence to a routing program, which returns an estimate of the route traveled by the vehicle. The estimated route is presented as a series of segments with a corresponding mileage and average expected speed associated with each segment. The miles associated with each segment are added together to determine the total distance traveled.

The routing program contains a database which identifies state boundaries and other jurisdictional information, such as the presence of toll roads. When the routing program identifies that a border crossing has occurred in any position segment, miles are allocated to each jurisdiction based on the vehicle locations just prior to and after the border crossing. The position of the border crossing is inserted as if it were a position in the data set. Furthermore, time-stamp information for the border crossings can be estimated through interpolation of the time-stamps from position data transmitted by the vehicle. Thus, the routing program can usually provide a good estimate of the miles driven within each identified jurisdiction.

An even more accurate estimate of the route traveled by a vehicle is obtained by comparing the estimated miles as provided by the routing program to the actual odometer/hubometer readings transmitted from the vehicle, if available. If the estimated miles driven differs from the actual miles driven by a predetermined amount, the estimated route is reviewed to determine if the vehicle traveled a different route than what was originally estimated and/or to identify segments in which the apparent average speed of the vehicle is significantly different than the average expected speed in each segment. Mileage can be allocated or de-allocated to the suspect segments and thus to the appropriate jurisdiction, resulting in a more accurate determination of miles traveled in each jurisdiction.

The just described system works well even using infrequent odometer/hubometer readings. More frequent odometer/hubometer readings may be undesirable because of the costs involved in transmitting information in a satellite communication system. Additionally, some communication systems are limited by their messaging protocols in the amount of data that can be sent within a single message packet. In these systems, an additional data packet must be transmitted to communicate odometer/hubometer information to the fixed station. By providing odometer/hubometer information on an infrequent basis, costs are kept to a minimum without compromising accuracy in mileage determination.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Overview

Figure 1:
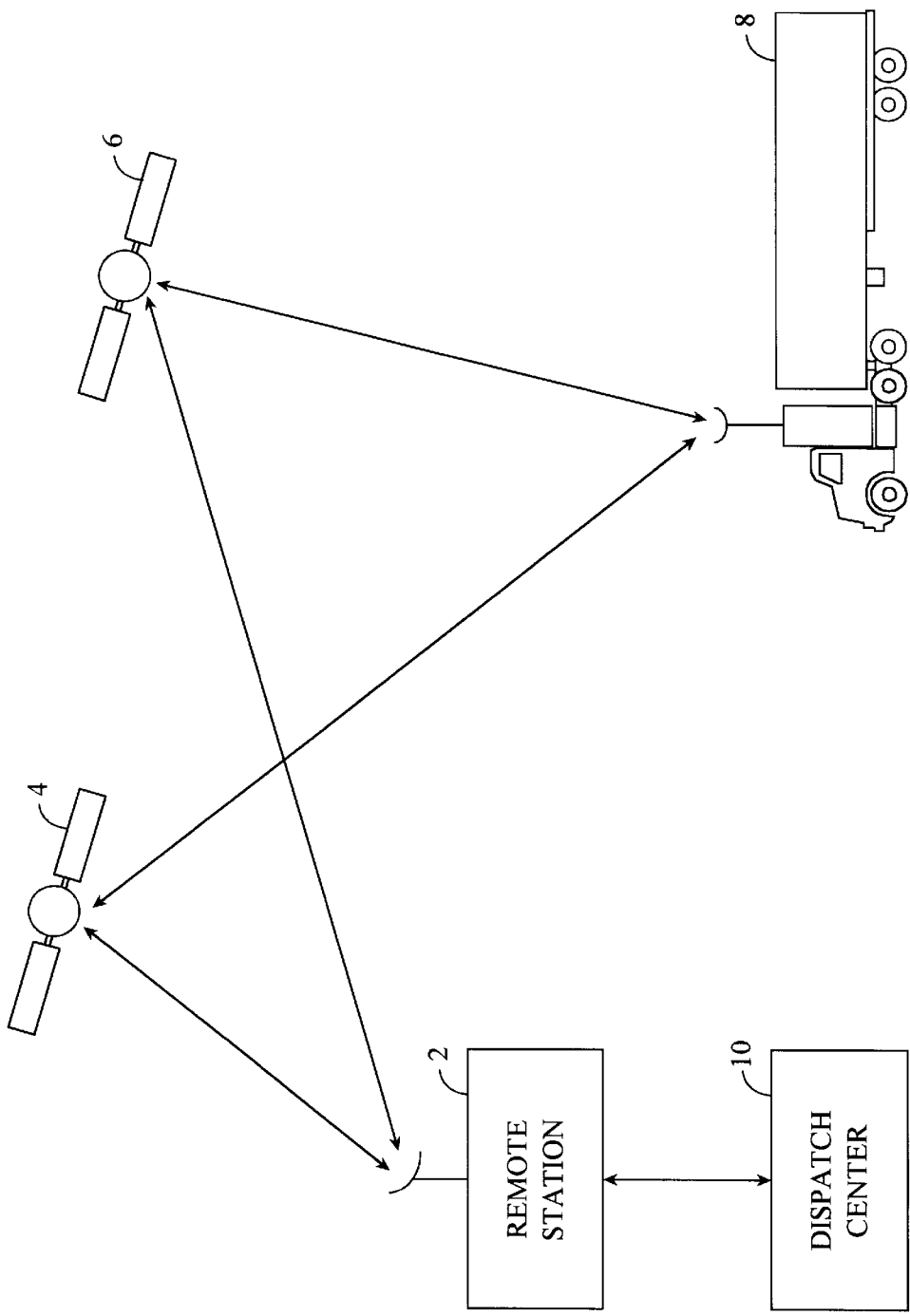
FIG. 1 is an illustration of a vehicle in communication with a fixed station.
Figure 3A:
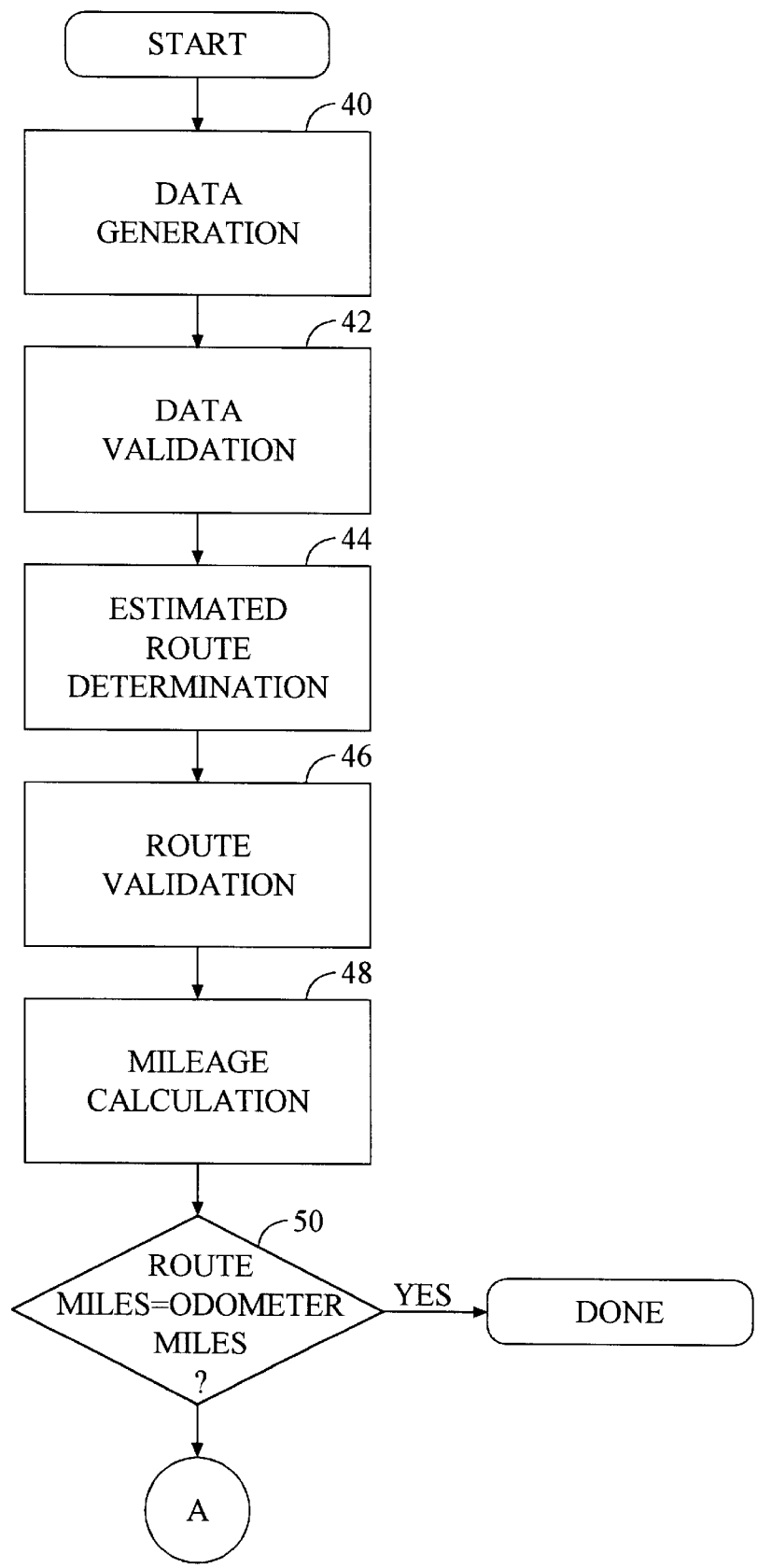
FIGS. 3a and 3b are a flow diagram illustrating the process of route determination and validation.
Figure 3B:
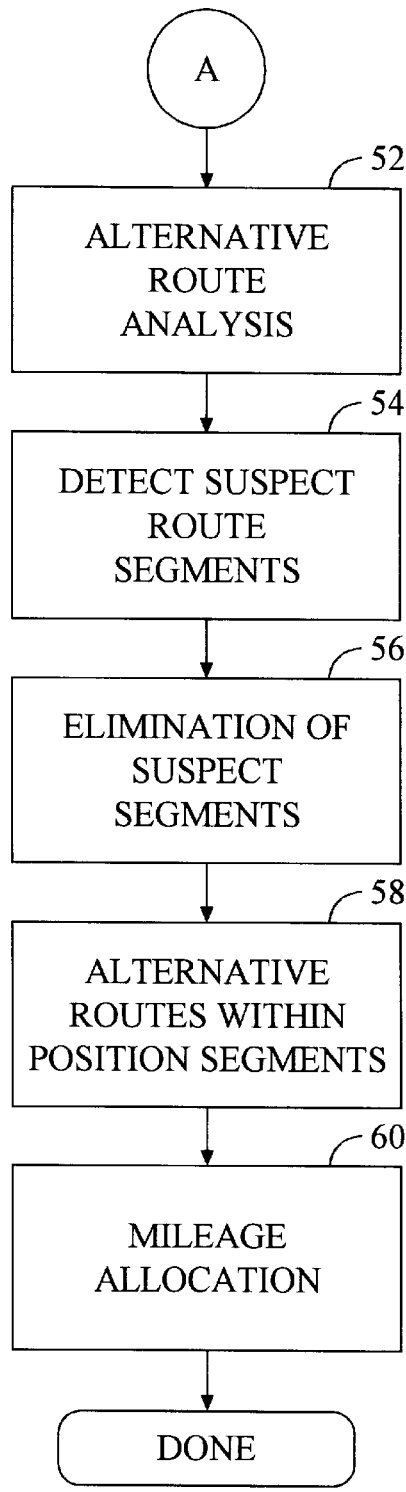

The method of route and distance determination of the present invention is best illustrated in the context of a land based mobile unit, typically a vehicle in the commercial trucking industry. It should be understood, however, that the present invention may be used in any application where accurate mileage determinations within given jurisdictional boundaries are desired. The components required for route and distance determination are depicted in FIG. 1. A flow diagram depicting the method of route determination and mileage allocation is shown in FIGS. 3a and 3b.

A communications hub or fixed station 2 in FIG. 1 is capable of communication with data satellite 4 and positioning satellite 6. Fixed station 2 communicates via satellite with vehicle 8 which in this case is a commercial trucking vehicle having a mobile communications terminal (MCT) mounted in the tractor or cab of the vehicle, not shown. The mobile communications terminal is capable of respectively transmitting and receiving communication signals to and from data satellite 4 and of receiving communication signals from positioning satellite 6. It is well known in the art that vehicle locations may be determined via satellite, for example through trilateration from a dual satellite navigation system as disclosed in aforementioned U.S. Pat. No. 5,017,926, entitled "DUAL SATELLITE NAVIGATION SYSTEM AND METHOD" (the "AMES" patent) assigned to the assignee of the present invention and incorporated by reference herein.

Position data and a corresponding time-stamp is calculated at fixed station 2, while other information, such as a vehicle ignition, vehicle identification, and odometer information, is transmitted at various times by vehicle 8 to fixed station 2 and stored for later use. When it is desired to determine the route traveled by the vehicle, this data is retrieved and first evaluated for errors using a series of validation checks. After the data has been validated, it is provided to a routing program which uses the position data to produce an estimated route that the vehicle traveled. The estimated route is comprised of a series of position segments, each position segment having a mileage and an estimated speed associated with it. The process of mileage determination may be performed at fixed station 2, or it may be performed at a remote location, such as a dispatch center, shown in FIG. 1 as dispatch center 10.

The position segments returned by the routing program are checked for obvious errors by a second set of validation tests. Once these test have been successfully completed, the mileage traveled by the vehicle in each jurisdiction may be calculated by adding the position segment mileage in each jurisdiction. The routing program contains a database which stores the location of jurisdictional boundaries, enabling the routing program to allocate miles proportionally between adjacent jurisdictions, if desired.

The vehicle's estimated travel route provided by the routing program can be checked for accuracy by comparing it to the vehicle's odometer mileage, if two or more odometer readings were transmitted by vehicle 8 along the route. The route traveled by vehicle 8 in-between two odometer transmissions is called an odometer segment, which is comprised of one or more position segments. The position segments are defined as the route traveled between two reported vehicle locations, transmitted at least once each predetermined time interval. In the exemplary embodiment, the predetermined time interval is one hour.

If no significant mileage deviation is found between actual miles traveled as reported by the vehicle odometer and the estimated route miles as calculated by the routing program, the estimated route of travel is thought to be correct, and the mileage allocated to each jurisdiction deemed to be highly accurate.

If a significant mileage mismatch if found between odometer mileage and estimated route mileage within an odometer segment, alternate travel routes are examined to see if the mileage difference can be reduced or eliminated. If no alternate route resolves the mileage mismatch, tests are performed on each position segment to identify suspect segments which indicate either abnormally high or low-speed apparent vehicle speeds. Then the identified position segments are analyzed to determine in which segments the mileage difference can be allocated. After the mileage difference has been allocated to the suspect position segments, the resulting mileage within the odometer segment is again checked against the actual odometer mileage, and if a significant difference still exists, the user is prompted to manually allocate the mileage difference.

II. Data Generation

As shown in FIG. 3a, data generation step 40 is performed which provides the basis on which route and mileage estimations are accomplished. In an exemplary embodiment of the present invention, the location of vehicle 8 is determined by the method disclosed in the AMES patent and is calculated by fixed station 2 at predetermined time intervals. In the exemplary embodiment, position data is determined once per hour. It should be understood that any number of position determining methods may be used instead, such as a Global Positioning System (GPS). The location may be expressed according to any earth-fixed coordinate system such as latitude and longitude. The location information, as well as a time-stamp, or the date and time the location information was captured, is stored in a memory device located at fixed station 2. In addition, for every position determination, a vehicle identification number is transmitted by vehicle 8 which uniquely identifies each vehicle in the system. The vehicle identification number may be any number that uniquely identifies the vehicle. For example, the vehicle identification number may be the actual vehicle registration number stamped on the vehicle, or it may be the mobile communication terminal serial number associated with the particular vehicle. In the exemplary embodiment, the vehicle identification number is the MCT serial number.

Due to system capacity and cost constraints, the position data is collected only once per hour in the exemplary embodiment. However, position data may be obtained more frequently, such as when a text message is transmitted by vehicle 8. Text messages may include pre-formatted messages which are sent by vehicle operators to communicate predefined messages to fixed station 2. For example, a formatted text message may be sent by a driver immediately after delivering a load and may include a predefined data field identifying the operator, his present location, drop-off time of the load, and/or other information of interest. By transmitting the data in a formatted text message, a minimum amount of data is sent to fixed station 2, thereby reducing the length of the data message and, thus, the transmission costs. In the vehicle positioning system disclosed in the AMES patent, the vehicle position is determined upon the transmission of any text message, pre-formatted or not, because the vehicle positions are calculated based upon the time differential between data received from data satellite 4 and data received by positioning satellite 6. Therefore, when a text message is sent, the vehicle position is calculated at no additional cost.

In addition to enabling vehicle position to be calculated when a text message is sent, it is economically feasible to include the actual vehicle mileage as reported by the vehicle's odometer in such a message as well. The odometer information represents any mileage reading from the vehicle which indicates the incremental change in distance traveled for any segment of the vehicle's operation. Thus, odometer information does not necessarily originate from the actual dashboard odometer, nor does it necessarily represent the life-to-date mileage of the vehicle. For instance, the mileage information transmitted by vehicle 8 may originate from a hubometer on the vehicle, totally independent of the mileage presented to the driver by the vehicle odometer located on the dashboard.

In the exemplary embodiment, mileage information is transmitted along with every text message sent due to the relative infrequency that text messages are transmitted. It is not feasible to include mileage information with every position transmission in large systems because such systems may process three to four million position transmissions per day from thousands of vehicles in the system. The additional mileage information would strain system capacity as well as add significant costs to trucking companies paying for messaging capabilities. It should be understood that the vehicle's mileage information may be sent upon the occurrence of events other than the transmission of text messages, and may be sent more frequently or less frequently, depending on cost or other considerations.

Other useful information are be transmitted by vehicle 8 whenever a position is determined. For example, in the exemplary embodiment, the vehicle's ignition status, either on or off, is automatically included as part of any message that is transmitted by vehicle 8. This information is useful for refining the analysis of the vehicle's apparent speed between two reported positions, as will be discussed later herein. This kind of information is cost effective and can be included in every position determination because it requires only one bit to convey the information.

Figure 2:
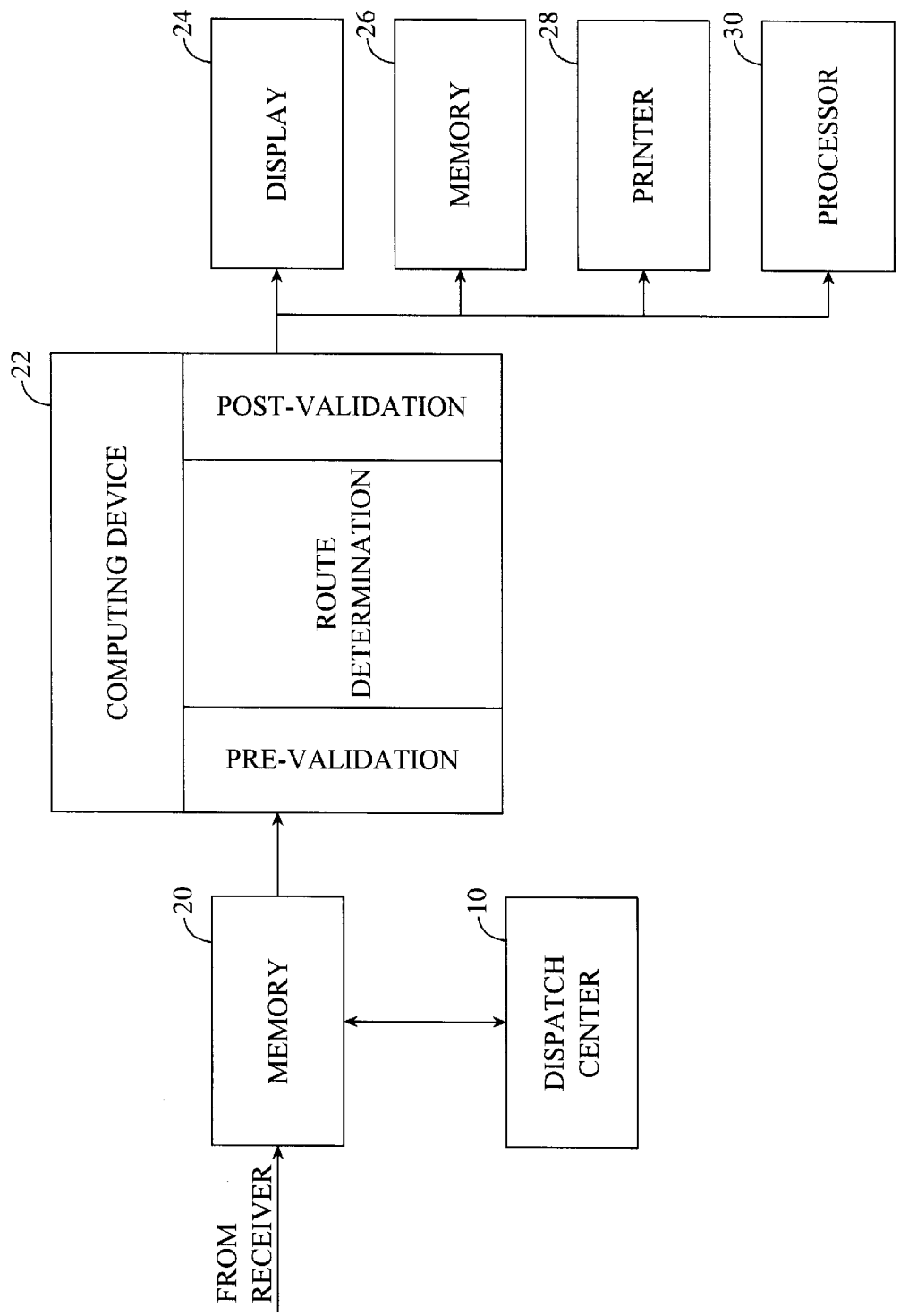
FIG. 2 is an illustration of an exemplary embodiment of a system of the present invention including the components necessary to store, process and report miles traveled by a vehicle within predetermined jurisdictional boundaries.

FIG. 2 is a block diagram of the preferred embodiment of the present invention. Memory 20 stores vehicle information as received and processed by fixed station 2. The stored data may include vehicle locations with corresponding time-stamps, a Mobile Communications Terminal (MCT) number which corresponds to the identity of a particular vehicle, actual mileage readings, and other information pertaining to the operating characteristics of the vehicle. The Mobile Communications Terminal (MCT) number may be any alpha-numerical sequence which uniquely identifies the vehicle. Memory 20 is typically located within fixed station 2, but may also be remotely located. Computing device 22 executes a data validation process, a route determination program to perform an initial mileage estimation, and a post-validation process to validate the route determined by the route determination program and to compare the estimated mileage to actual odometer readings if available. The route determination program uses vehicle locations to produce an estimate of the actual route traveled by the vehicle.

The actual mileage information, vehicle identification number, estimated route traveled, longitude/latitude figures and any other useful data may be displayed to a system user via display 24, or printed using printer 28. The data may also be stored on a second memory 26, for example a diskette, forwarded to a second location, and/or processed further using processor 30. Any or all of the above described functions may alternatively be accomplished at a remote location, such as dispatch center 10.

III. Data Validation

Step 42 in FIG. 3a represents the step of validating data stored in memory 20 prior to submission to the routing program. Several checks are performed in this step including position validation, odometer validation, and vehicle speed validation.

All vehicle positions stored in memory 20 are checked for any locations that are inconsistent with adjacent vehicle positions. For instance, if the a series of position locations indicate that a vehicle is traveling at 55 miles per hour along a particular highway, then a single vehicle position indicating that the vehicle was 200 miles from that highway would be flagged as an errant location point at step 42, and would not be included as an input to the routing program. Additionally, each position location is checked in step 42 to verify that it does not coincide with an unlikely vehicle location, such as in a lake or a river.

Various validations involving odometer readings are also verified in step 42. Each odometer reading is first checked to ensure that it is greater than the last odometer reading. Occasionally, a defective odometer or hubometer on a vehicle is replaced with a new one having less miles on it than the defective unit. The abrupt change in odometer/hubometer readings would corrupt the calculations in subsequent mileage determinations if this check was not performed. If this validation fails, the system operator is notified of the problem and the odometer reading is disregarded.

The mileage between odometer readings, defined as the odometer segment, is also checked to ensure that it is equal to or greater than the point-to-point mileage for all position segments which make up the odometer segment. For example, if a vehicle reports five position locations (ie, four position segments) having odometer information provided at the end points of the odometer segment, the estimated route mileage between odometer readings should be greater than or equal to the straight-line mileage of the four position segments combined. The mileage of each straight-line position segment can easily be determined by using the latitude/longitude coordinates of the position locations. The actual miles traveled in any position segment by a vehicle is usually greater than the straight-line mileage calculation due to curves and elevational changes in the road. If this validation check fails, the system operator is notified of this problem and the odometer reading is ignored.

The average speed of the vehicle between any two odometer readings is checked to ensure that it does not exceed a predetermined maximum. In the exemplary embodiment, the maximum speed permitted is 70 miles per hour, although this figure is user configurable. The odometer information and time between readings are used to arrive at the vehicle's average speed, by simply dividing the distance traveled by the time between odometer readings. If this validation fails, the system operator is notified of the problem and the odometer reading is ignored.

The final data validation check performed in step 42 ensures that no two vehicle positions are more than two predetermined time periods apart from each other. In the exemplary embodiment, vehicle positions are reported once per hour, therefore no two vehicle positions having an "ignition on" status should be greater than 2 hours apart in time. A vehicle position transmission may be missed, for example, when the communication satellite link is lost between the vehicle and one or more satellites. This may be due to a physical obstruction such as an overpass or a tall building. In addition, no vehicle positions are expected following an "ignition off" message until an "ignition on" message is received.

If two or more positions are missed consecutively with "ignition on" status, it is assumed that a malfunction has occurred in the positioning system and the system operator is notified of the problem. If this validation is satisfied, the vehicle position data, time-stamps, and odometer readings are provided to the routing program to determine the estimated route traveled by the vehicle, shown as step 44 in FIG. 3a.

IV. Estimated Route Determination

Figure 4:
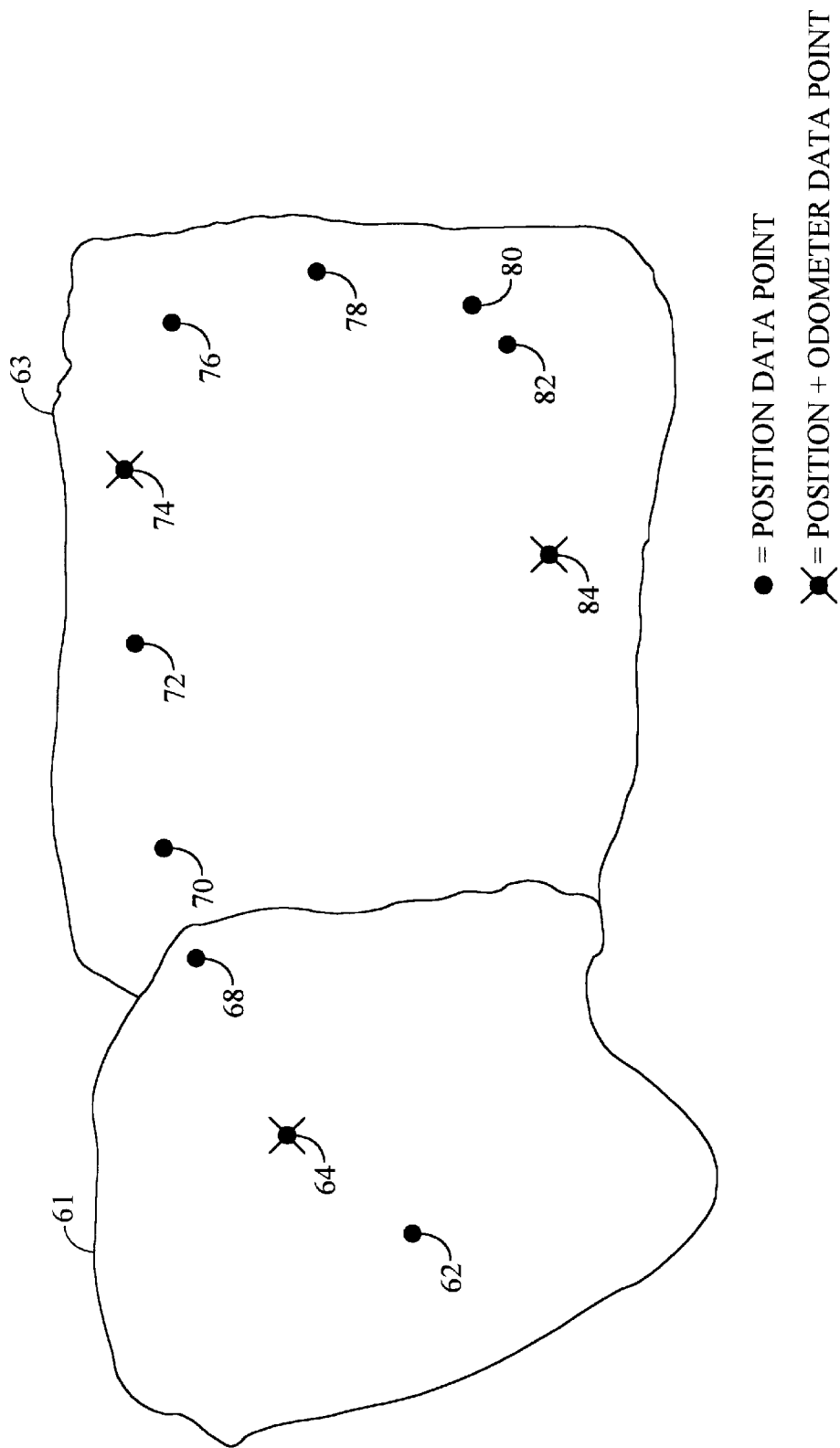
FIG. 4 is an illustration of a map showing the position locations and odometer/hubometer readings of a vehicle traveling along a multi-jurisdictional route.

FIG. 4 is a map illustrating the position locations of vehicle 8 captured by fixed station 2 as vehicle 8 travels between jurisdictions 61 and 63. Data points 62, 68, 70, 72, 76, 78, 80, and 82 represent vehicle locations determined by fixed station 2 in one hour increments, although it should be understood that more or less frequent vehicle positions may be determined, depending on system capacity and/or cost constraints. Data points 64, 74, and 84 represent locations in which a text message was sent by vehicle 8 which enables fixed station 2 to determine the vehicle's location at those points as well. Odometer information is also received by fixed station 2 at data points 64, 74, and 84 along with the text message. Vehicle 8 is shown as passing from jurisdiction 61 to jurisdiction 63, such jurisdictions usually representative of individual states, although local jurisdictions may be represented as well. The location, time-stamp, vehicle identification number, odometer information, ignition status, and any other pertinent data is stored in memory 20 at fixed station 2.

The vehicle locations are taken from memory 20 located at fixed station 2 and provided to a commercially available routing program which contains coordinates that identify known travel routes such as freeways, interstates, highways, and other roadways. For example, any commercially available software program such as PC Miler sold by ALK Associates, Inc. may be used. The commercial routing program uses the position data stored in memory 20 to return a set of position segments that estimate the route traveled by vehicle 8. The routing program provides a "best fit" approximation of the route traveled by vehicle 8 which may not coincide exactly with each position data point. The position segments may be provided in an alphanumeric format, by mapping the position segments to a map showing the route taken, or both. Additional data may be provided to the routing program such as load pickups, load drops, fuel purchases and receipt transaction records to provide even greater accuracy in determining the most likely route traveled by vehicle 8. The routing program also returns a set of expected average speeds, corresponding to each position segment, representing the vehicle's expected speed along each position segment.

Position segments which cross jurisdictional boundaries are broken into two position segments, each segment ending at the jurisdictional boundary. This allows the routing program to accurately allocate miles between jurisdictions when vehicle 8 crosses from one jurisdiction into another. Once all position segments have been identified, the total distance traveled within a given jurisdiction may be calculated by adding together the mileage of each position segment traveled within that jurisdiction. However, further route analysis, validation, corrections, and/or mileage allocations may be done by using odometer information from vehicle 8 as a check against the estimated mileage provided by the routing program. Mileage by jurisdiction would then be recalculated once all additional changes are completed.

Figure 5:
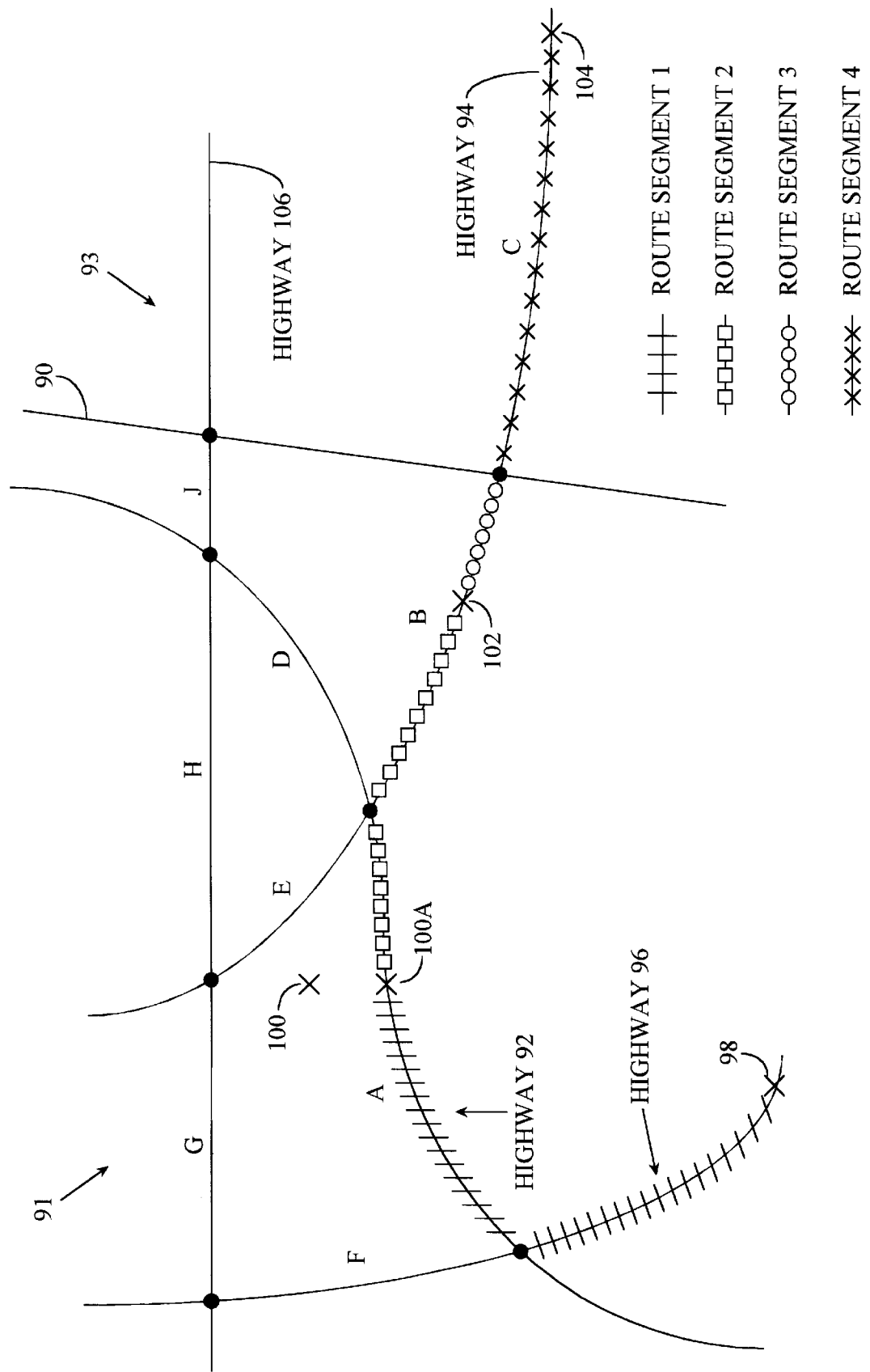
FIG. 5 is an illustration of a detailed map showing how routes are estimated and how position segments are determined.

FIG. 5 shows a detailed map of how routes are estimated and how position segments are determined. As vehicle 8 travels along highway 96, fixed station 2 calculates vehicle positions once per hour in the exemplary embodiment, shown as positions 98, 100, 102 and 104. Each position has associated with it a time-stamp, or date and time at which the vehicle position was determined. In this example, it is assumed that no text messages were sent by vehicle 8, therefore, no odometer information is available.

The routing program first determines the most likely route that vehicle 8 took using the position data from memory 20. The routing program estimates that vehicle 8 traveled first along highway 96, then onto highway 92 and finally to highway 94, using the position data alone. Although vehicle 8 was capable of traveling along a different route and logging the position locations shown, the routing program makes decisions based upon the vehicle location data to arrive at the most likely route taken. Note that the estimated route does not include position data point 100. The routing program estimates that vehicle 8 traveled on highway 92 based on a "best fit" scenario. As a result, position 100a is used to denote the position segment endpoint.

Route segments are shown in FIG. 5 as letters A, B, C, D, E, F, G, and H. Each route segment is defined as a known, fixed distance between the two intersecting points along a highway or between a highway intersection point and a jurisdictional boundary, shown in FIG. 5 as jurisdictional boundary 90. The routing program then combines route segments into position segments defined by vehicle location data points 98, 100a, 102, and 104. For example, the routing program will define position segment 1 as the route traveled between data point 98 and data point 100a, position segment 2 as the route traveled between data point 100a and 102, and so on. The routing program will calculate the miles of each position segment by adding route segments and estimating mileage when a vehicle location falls between route segments. If a position segment crosses a jurisdictional boundary, it is broken into two distinct position segments, each defined as the distance between the vehicle location and the boundary. For example, in FIG. 5, one position segment will be defined between data point 102 and boundary 90 and another position segment between boundary 90 and data point 104.

V. Route Validation

After an initial estimated route has been generated, it is checked for any major discrepancies that may have occurred during the route estimation process, shown in FIG. 3a as step 46.

The first route verification compares the mileage reported for each position segment by the routing program to the straight-line miles calculated from the latitude/longitude information corresponding to the position segment endpoints. If the estimated miles for any position segment from the routing program is less than the straight-line miles between the position segment endpoints, an error is indicated to the system user so that a manual correction can be accomplished by the system user.

The next validation evaluates the apparent average vehicle speed in each position segment to determine if it exceeds a predetermined maximum threshold. In the exemplary embodiment, the predetermined maximum speed is 80 miles per hour. The apparent average vehicle speed is determined by dividing the miles in any position segment as reported by the routing program by the time difference between the position segment endpoints. If the predetermined average speed threshold is exceeded in any position segment, an error is indicated to the system user, so that the user may review the route segment manually, and investigate the source of the problem.

VI. Mileage Calculation in Each Jurisdiction

After the estimated route traveled by vehicle 8 has been generated by the routing program, the miles traveled in each jurisdiction can be determined by adding the position segment mileage contained within each jurisdiction, shown in FIG. 3a as step 48. Referring to FIG. 5, the mileage traveled by vehicle 8 in jurisdiction 91 is calculated as the mileage associated with position segments 1, 2, and 3, while the mileage traveled in jurisdiction 93 is the mileage associated with position segment 4. It should be understood that one or more route segments comprise a position segment, and that one or more position segments comprise an odometer segment. If an odometer segment falls entirely within a single jurisdiction, for instance entirely within a given state boundary, then the mileage associated with the odometer segment is used as the correct mileage figure, and the estimated mileage from the routing program is ignored.

VII. Route Validation using Odometer Information

Once the miles driven per jurisdiction have been calculated, the estimated route of travel can be checked by comparing the estimated route mileage to the actual odometer mileage reported by vehicle 8, shown as step 50 in FIG. 3a. Odometer information is available any time a text messages was transmitted by vehicle 8. If the estimated route mileage agrees closely with the odometer mileage, it can be assumed that the vehicle in fact traveled along the estimated route provided by the routing program and therefore, the mileage allocation in each jurisdiction is accurate as well. This concept can be demonstrated by referring to FIG. 6, which is a depiction of an estimated route traveled by vehicle 8 as determined by the routing program.

Figure 6:
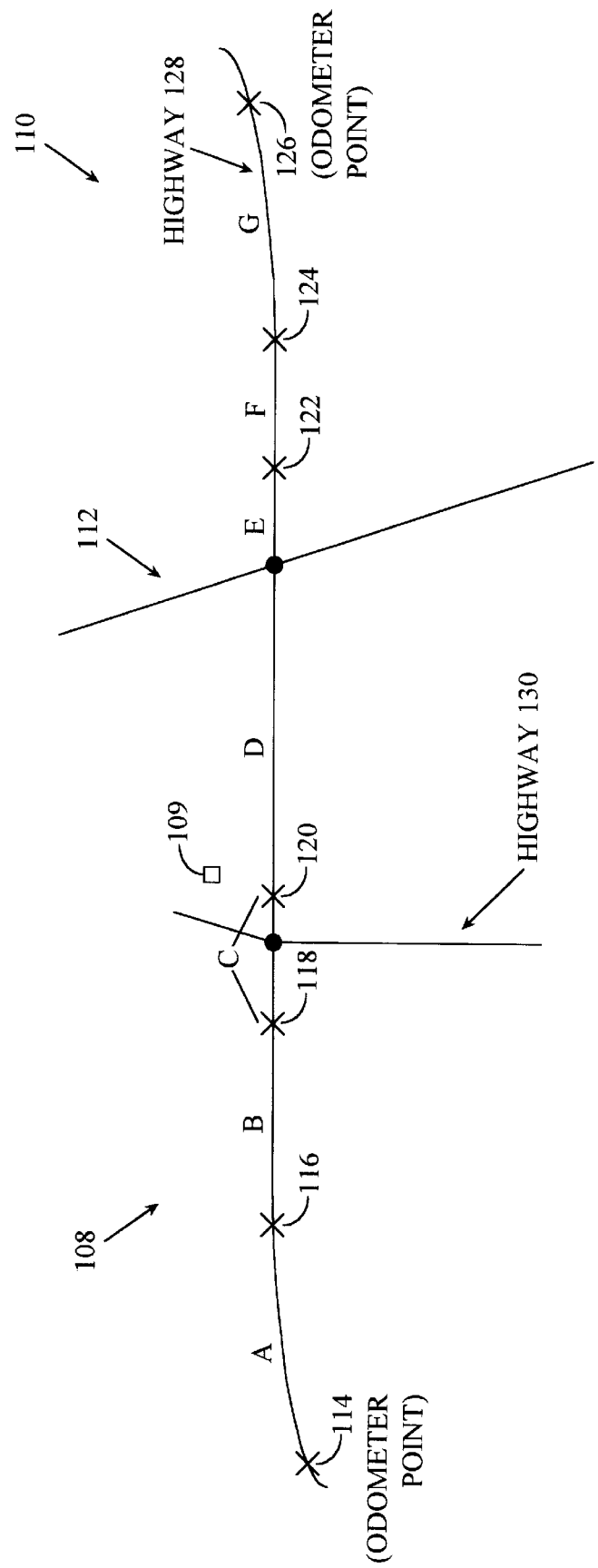
FIG. 6 is a depiction of the estimated route traveled as determined by a routing program.

As previously described, vehicle positions are determined at one hour intervals in the exemplary embodiment, shown as data points 116, 118, 120, 122, and 124 in FIG. 6. Data points 114 and 126 represent vehicle locations at the time a text message was sent by vehicle 8. The actual odometer mileage at locations 114 and 126 are also transmitted to fixed station 2 along with the text message. As stated previously, the route between odometer readings is called an odometer segment, which is comprised of, in this case, several position segments.

The routing program determines that vehicle 8 traveled along highway 128 from data point 114 to data point 126. The routing program breaks the estimated route traveled into position segments, labeled A through G, in accordance with vehicle position data, then adds the miles in each position segment together to determine total miles traveled within each jurisdiction. For example, in jurisdiction 108, the mileage associated with position segment A is added to the mileage associated with position segments B, C, and D to arrive at an estimated mileage driven in that jurisdiction. Similarly, in jurisdiction 110, mileage associated with position segments E, F and G are added together to estimate the miles driven in that jurisdiction. The mileage that vehicle 8 actually traveled can be easily calculated in this example by simply subtracting the starting odometer mileage from the ending odometer mileage. The actual mileage can be compared to the estimated route mileage in the odometer segment and if a significant mismatch is found, the estimated route mileage is analyzed to determine if it can be reconciled with the actual odometer mileage. If, for instance, the estimated route mileage in the odometer segment is estimated to be 110 miles, but the actual odometer mileage indicates a distance of 135 miles, a 25 mile discrepancy is noted and a diagnostic procedure is performed to determine if the discrepancy can be corrected.

In the exemplary embodiment of the present invention, two general methods of reconciliation are available. One method determines if vehicle 8 could have traveled along another route in-between the odometer segment endpoints. A second method identifies position segments which appear to have significant speed variances from expected speeds provided by the routing program.

1. Alternative Route Analysis

The routing program first tries to reconcile mileage mismatches by trying alternative travel routes in an odometer segment to determine if any new route reconciles the mileage mismatch. This step is shown in FIG. 3b as step 52. In addition, each position segment can be examined to determine if an alternative route within the position segment would reduce or eliminate the mileage mismatch.

The initial estimated route calculated by the routing program is based on the most "practical" route according to the position data. Other alternative routes may be calculated by the routing program based on the shortest possible route, routes excluding toll roads, routes using toll roads, or any number of possible variations. If additional information is available from the truck, for instance toll receipts indicating whether or not a toll road was traveled in the timeframe being processed, it may be used to specify a toll or a non-toll route. If a toll receipt is available, a verification can be done to see if the estimated route provided by the routing program includes a toll road and if so, the name of the toll road as a cross-check. If the mileage mismatch using one of the alternative routes is within an acceptable tolerance, that route is chosen as the route probably traveled by vehicle 8, and no further analysis is required. If the alternative routes still do not reconcile the mismatched miles, the most "practical" route is defaulted to as the most probable route traveled by vehicle 8 and then each position segment individually is checked to determine if alternate routes were possible within the position segment which would reconcile the mileage mismatch.

Alternate routes may be processed automatically or manually. In the exemplary embodiment, alternate routes are only attempted manually, although various mileage allocations may be performed automatically. The system user will be prompted to manually attempt route reconciliation and/or mileage allocation as a final step after automatic processing is completed. In an alternative embodiment, automatic or manual route correction occurs prior to mileage allocations. Automatic mileage allocations are tried automatically, unless the mileage mismatch exceeds a user-configurable, predefined threshold. The system user will be prompted to manually attempt route conciliation if the number of mismatched miles exceeds the predetermined threshold. This may be accomplished by projecting a map of the estimated route onto a map of all possible routes that vehicle 8 could have traveled. For example, position locations which are located very close together may indicate a possible detour off the position segment. Referring again to FIG. 6, the map may indicate the presence of highway 130, for example, having truck stop 109 located just north of highway 128. The system user may then suppose that vehicle 8 detoured to truck stop 109, then resumed his route along highway 128. The operator would then compare the estimated route mileage using the alternative route to the odometer mileage in the odometer segment. If the mileage mismatch between estimated miles and odometer miles is less than the predetermined threshold, any left over miles could be allocated proportionally to each position segment in the odometer segment, as will be described later herein. If the mileage mismatch using the alternative route remains outside the acceptable tolerance, another alternate route may be selected and the process repeated. Any such route corrections may optionally be confirmed later with the vehicle operator, to ensure accuracy. In the exemplary embodiment, if no other alternative routes are available, the most practical route is defaulted to and a procedure to identify suspect position segments is used to reconcile the mileage mismatch.

2. Detection of Suspect Position Segments

A second general method of reducing or eliminating a mileage mismatch is to detect suspect position segments based upon the apparent average speed of the vehicle in each segment, shown as step 54 in FIG. 3b. For each position segment, the apparent average speed of the vehicle is calculated and compared to an average expected speed supplied by the routing program database. If a significant difference in average speeds is found, it might indicate a problem with the estimated route traveled by vehicle 8 within that position segment.

For example, the average expected speed of a vehicle on a major highway could be stored by the routing program database as fifty-five miles per hour. In FIG. 6, the position segments between data points 114 and 126 are then analyzed to find out which position segment indicates an apparent average speed significantly greater or less than 55 miles per hour. The apparent average speed of the vehicle can be calculated in each position segment by dividing the estimated mileage in each position segment by the difference in time between position segment end points. If the difference between the apparent average speed and the expected average speed exceeds a predetermined threshold in any position segment, that position segment is flagged as being suspect. Alternate travel routes within the position segment are evaluated to determine if the alternative route will resolve the mileage mismatch. If not, miles are either added or subtracted from position segments, based on an allocation method, to be discussed later herein.

Another way to determine suspect position segments is to determine if any actual vehicle positions are more than a pre-determined distance away from the position segment endpoint associated with it. For example, the routing program provides an estimated route, comprised of position segments, to the system user, based upon actual positions transmitted by the vehicle. However, the routing program only returns a "best fit" route which may not align exactly with every actual vehicle position. In most cases, the actual vehicle position and the route segment endpoint will, in fact, align with each other. However, when an actual position does not align itself with the estimated route, the position segment endpoint defined by the actual position is reported by the routing program as falling directly on the estimated route. Hence, it is possible for an actual vehicle position and its associated position segment endpoint to have two different locations. If any actual vehicle position is more than a pre-determined distance away from its associated position segment endpoint, then the two position segments containing that endpoint are flagged as suspect. Both suspect position segments may then be checked for the possibility of a detour from the estimated route by trying alternative travel routes.

VIII. Elimination of Suspect Position Segments

Suspect low speed position segments are sometimes eliminated from being considered suspect if certain criteria are met. For example, if a suspect position segment has an "ignition off" status at either position segment endpoint, that segment will be excluded from the list of suspect segments. The step of eliminating suspect position segments from is shown as step 56 in FIG. 3. As described earlier, the ignition status of the vehicle is transmitted any time a position is calculated. If a low-speed position segment is identified having an "ignition off" at either endpoint, it would mean that the vehicle was stopped, which would make the vehicle seem to be traveling more slowly in that segment. The same reasoning applies if either position segment endpoint is the result of a text message being received. In that case, it is assumed that the vehicle was stopped in order to transmit the message, again resulting in a much lower average speed in that position segment.

Another way in which suspect low speed position segments are eliminated as being suspect is if multiple low speed position segments are discovered adjacent to one another. In this scenario, it is assumed that the vehicle was slowed due to traffic congestion, therefore the mileage reported by the routing program is probably valid. In the exemplary embodiment, any suspect low-speed position segment having at least one other low-speed segment adjacent to it will be removed from the list of suspect segments.

Yet another way in which suspect low-speed position segments are removed from further investigation is to determine if any access routes were available at any point within the position segment. If not, it is unlikely that the vehicle detoured from the estimated route and therefore the estimated mileage from the routing program is probably correct. For example, if a position segment is comprised of only a toll road, then no other routes are generally available to the vehicle, and a high degree of likelihood exists that no detour was taken. Therefore, a high degree of certainty exists that the mileage as reported by the routing program is correct.

IX. Correction of Suspect Position Segments

Suspect position segments may be corrected by trying alternative travel routes within the position segment, or by allocating miles to the suspect segments in a predetermined procedure. Either method may be performed automatically, without manual intervention. However, a system user can set a limit on the number or percentage of miles that are automatically corrected. If the number of corrected miles exceeds the predetermined amount, no mileage will be allocated and the operator will be prompted to manually perform the correction.

1. Alternative Routes within Position Segments—High Apparent Average Speeds

As shown in FIG. 3b, step 58 is performed to determine if an alternate route of travel was taken by the vehicle within each suspect position segment. If the apparent average speed of the vehicle in any position segment is greater than the average expected speed in the position segment, it is assumed that the vehicle actually traveled a shorter route than what the routing program had estimated. In this case, one or more shorter alternative routes are calculated by the routing program and the new apparent average speeds calculated based on the shorter distance of the alternate route. If one or more of these shorter routes results in the average speed being within an acceptable tolerance of the average expected speed of the new route, then the route which has the closest match is selected as the most probable route taken by the vehicle. If none of the routes results in a match as described, but one or more results in a low average speed, then the route with the highest of those is selected as the most probable route taken. Finally, if neither of these outcomes occurs, then the route alternative with the lowest average speed (among those which are considered too high) is selected. In the exemplary embodiment, a position segment will be flagged as suspect if the vehicle's apparent average speed is 20% and 10 miles per hour greater than the average expected speed as provided by the routing program.

2. Alternative Routes within Position Segments—Low Apparent Average Speeds

If the apparent average speed of the vehicle in any position segment is less than the average expected speed in the position segment, it is possible that the vehicle traveled a longer route than what the routing program had estimated. In this case, any potentially longer alternative route is calculated by the routing program and a new apparent speed is calculated, based on the longer distance of the alternative route. If the new apparent average speed falls within an acceptable tolerance of the average expected speed for the new route without exceeding the average expected speed, that route is selected as the most probable route taken by the vehicle. If not, the longest alternative route now within tolerance is chosen as the most probable route traveled by the vehicle. In the exemplary embodiment, a position segment will be flagged as suspect if the vehicle's apparent average speed is 20% and 10 miles per hour less than the average expected speed as provided by the routing program.

One method of determining whether or not a vehicle detoured from the calculated position segment is to identify nearby via points or landmarks that the vehicle may have traveled to. Such a detour might be expected if any landmarks or "via points" were present in proximity to the estimated route. A non-exhaustive list of landmarks or viapoints include truck stops and fueling stations. The locations of landmarks and via points are predetermined and stored within the routing program. If an alternate route through the landmark or via point reconciles the mileage mismatch within the odometer segment, that route will be used as the most probable route traveled by the vehicle. Otherwise, the "most practical" route is defaulted to.

Following any route corrections, no further analysis is needed on any odometer segments which fall completely within a given jurisdiction, if the only information desired is the mileage traveled in each jurisdiction. The actual odometer mileage as transmitted by the vehicle is used to determine the miles traveled, and any estimated route miles as calculated by the routing program is ignored. However, if other information is desired, for example, an accurate determination of the actual route traveled by the vehicle, then mileage mismatches between actual mileage and estimated route mileage may be performed as described below.

3. Mileage Allocation

If the mileage mismatch is unable to be corrected by using an alternative travel route, the difference in mileage may be allocated or deallocated among position segments within the odometer segment, shown as step 60 in FIG. 3*b*. The following steps are performed when allocating mileage:

a) Route Mileage Greater than Odometer Mileage

If the estimated route mileage is greater than the actual reported odometer mileage after trying to correct for alternative routes, the operator can either choose to accept the higher mileage figure or try to de-allocated miles along the route, beginning with suspect segments having high average speeds. A user might be willing to use the higher mileage figure, for instance, in order to arrive at a conservative figure for reporting fuel taxes to taxing jurisdictions. The decision to automatically use the higher figure can be user configurable. That is, the higher mileage figure will be used unless the difference between odometer miles and estimated miles exceeds a predetermined tolerance.

If the higher mileage figure obtained from the routing program is used, a check is performed to ensure that the apparent average speed of each position segment does not exceed a predetermined maximum speed, for example, 80 miles per hour in the exemplary embodiment. If one or more position segments show an excess of the predetermined maximum speed, the miles in those position segments are reduced so that the apparent average speed falls below the predetermined maximum speed. The miles which were removed are then allocated proportionally to any position segments whose apparent average speed is well below the predetermined maximum speed.

If the actual odometer mileage is chosen to calculate the miles traveled in each jurisdiction instead of the higher estimated route mileage, miles are removed first from position segments having significantly higher apparent average speeds, up to a predefined limit. Any miles remaining are then removed from all position segments proportionally while ensuring that no position segment falls below the predetermined minimum average speed for each position segment.

b) Mileage Allocation—Route Mileage Less than Odometer Mileage

If the estimated mileage from the routing program is less than the reported odometer mileage between two positions, the mileage difference between the two figures can be allocated proportionally among the previously identified suspect low-speed position segments. The miles are allocated until the apparent average speeds of the suspect position segments are equal to the average expected speed in each position segment. The allocation is done automatically, up to a predefined number of miles If a significant mileage difference remains between the estimated route mileage and the reported odometer mileage after the initial allocation, the remaining mileage difference can be allocated to other low-speed position segments which have not been classified as suspect. The mileage is allocated to these low-speed position segments proportionally, until their apparent average speeds are equal to the average expected speeds from the routing program database. The allocation is done automatically, up to a predefined number of miles.

If a significant mileage difference still remains between the estimated route mileage and the reported odometer mileage after the secondary allocation, the remaining mileage difference can be allocated to all position segments proportionally, until each position segment's apparent average speed is equal to the maximum speed that is considered credible, for instance, 80 miles per hour. Again, the allocation is done automatically, up to a predefined number of miles.

If a significant mileage difference still remains between the estimated route mileage and the reported odometer mileage after the third allocation, the user is prompted to allocate the remaining miles or to manually reprocess the data to arrive at a more suitable figure for the route traveled by the vehicle.

5. Miscellaneous Validations

A validation of the vehicle's overall odometer accuracy may be performed using the mileage from the estimated route as determined by the routing program. First, any position segments which show a large mismatch between the reported odometer readings and the mileage from the routing program are excluded from consideration for this validation. Next, the total odometer mileage is compared to the routing program mileage. The two figures should, on average, agree closely with one another, as long as a significant number of miles are in the set of data, as well as numerous segments and odometer readings. If a significant mismatch exists between the two mileages, it might suggest a problem with the odometer calibration, or perhaps a global problem involving position data and/or routing program deficiencies. In either case, the operator can be notified and corrective action taken. For example, the operator may order a calibration of the vehicle odometer, or a complete manual re-examination of the results of the previous jurisdictional computations.

The previous description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for determining the route of travel by a vehicle comprising the steps of:

determining the location of said vehicle at a first pre-determined event;

providing a corresponding time-stamp for each vehicle location, and a vehicle identification number to a fixed station upon said vehicle position determination;

transmitting at least two odometer readings from said vehicle to said fixed station, each of said odometer readings being transmitted upon the occurrence of a second pre-determined event;

estimating a route of travel taken by said vehicle using a routing program, said routing program using at least said vehicle location to estimate said route of travel; and validating said estimated route of travel using said at least two odometer readings.

2. The method of claim 1 wherein the step of determining vehicle location comprises the step of calculating the vehicle location on-board said vehicle.

3. The method of claim 2 wherein a GPS positioning system is used to determine said vehicle locations.

4. The method of claim 1 wherein the vehicle location determination is calculated at said fixed station.

5. The method of claim 4 wherein a dual satellite positioning system is used to determine said vehicle locations.

6. The method of claim 1 wherein said first predetermined event is a time interval.

7. The method of claim 6 wherein said time interval is one hour.

8. The method of claim 1 wherein said second predetermined event is the transmission of a text message from said vehicle to said fixed station.

9. The method of claim 1 further comprising the step of pre-validating said vehicle locations, said time-stamps, and said actual vehicle mileage prior to estimating said route of travel using said routing program.

10. The method of claim 1 wherein said routing program provides a plurality of estimated position segments, each position segment having a corresponding mileage and average expected speed, wherein the miles traveled by said vehicle is estimated by adding the mileage of each of said position segments together.

11. The method of claim 1 wherein the validation step comprises the steps of:

comparing actual mileage traveled by said vehicle to mileage provided by said routing program and detecting differences therebetween; and correcting said vehicle mileage provided by said routing program if said mileage difference exceeds a predetermined amount.

12. The method of claim 11 wherein the step of correcting said vehicle mileage is performed without intervention by a system operator.

13. The method of claim 11 wherein the step of correcting said vehicle mileage is performed manually by a system operator.

14. The method of claim 11 wherein the step of correcting said vehicle mileage comprises the steps of:

identifying at least one position segment in which an apparent average speed of said vehicle is less than an average expected speed provided by said routing program by a predetermined amount; and proportionally allocating said mileage difference among said identified position segments.

15. The method of claim 11 wherein the step of correcting said vehicle mileage comprises the steps of:

providing an alternative estimated route of travel by said vehicle, whereby said alternative estimated route comprises at least one position segment, each position segment having a corresponding mileage FIG. associated therewith;

adding each mileage figure together to form a new total estimated mileage;

comparing said new total estimated mileage to said actual mileage and detecting a difference therebetween; and using said alternative estimated route as the actual route traveled by said vehicle if said mileage difference is less than a predetermined amount.

16. System for determining an estimated route of travel by a vehicle, said vehicle having a mobile communications terminal for transmitting an MCT number, odometer readings, and text messages to a fixed station, said system comprising:

a mobile communications terminal for transmitting said odometer readings and said text messages to said fixed station;

vehicle location determination means for calculating a plurality of vehicle locations and a corresponding time-stamp for each location;

a storage device for storing said time-stamps, said vehicle identification number, and said odometer mileage transmitted from said vehicle and for storing said vehicle locations and a processor for determining said estimated route of travel by said vehicle, for determining a total mileage traveled by said vehicle along said estimated route, and for correcting said estimated route of travel using said odometer mileage.

* * * * *